US008989125B1

United States Patent
Marupaduga et al.

(10) Patent No.: US 8,989,125 B1
(45) Date of Patent: Mar. 24, 2015

(54) ADAPTIVE COMP SCHEMES IN LTE NETWORKS BASED ON BATTERY LIFE

(71) Applicant: Sprint Spectrum L.P., Overland Park, KS (US)

(72) Inventors: Sreekar Marupaduga, Overland Park, KS (US); Rajveen Narendran, Olathe, KS (US); Andrew M. Wurtenberger, Overland Park, KS (US); Nicholas Kullman, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 117 days.

(21) Appl. No.: 13/801,707

(22) Filed: Mar. 13, 2013

(51) Int. Cl.
  *H04W 72/04* (2009.01)
  *H04W 52/02* (2009.01)
  *H04B 7/02* (2006.01)
  *H04B 7/04* (2006.01)

(52) U.S. Cl.
  CPC ........... *H04W 72/0406* (2013.01); *H04B 7/024* (2013.01); *H04W 52/0251* (2013.01); *H04B 7/0452* (2013.01)
  USPC ........... 370/329; 370/336; 370/311; 370/252; 455/67.11; 455/450

(58) Field of Classification Search
  None
  See application file for complete search history.

(56) References Cited

U.S. PATENT DOCUMENTS

| 8,743,791 | B2 * | 6/2014 | Nam et al. | 370/328 |
| 8,768,266 | B2 * | 7/2014 | Yamazaki | 455/69 |
| 2012/0287799 | A1 | 11/2012 | Chen et al. | |
| 2014/0036809 | A1 * | 2/2014 | Xu et al. | 370/329 |
| 2014/0099900 | A1 * | 4/2014 | Cili | 455/67.11 |
| 2014/0112247 | A1 * | 4/2014 | Chen et al. | 370/328 |
| 2014/0161054 | A1 * | 6/2014 | Sandberg et al. | 370/329 |

OTHER PUBLICATIONS

Prakash Bhat et al., LTE-Advanced: An Operator Perspective, IEEE Communications Magazine, Feb. 2012.
Ralf Bendlin, et al., Embracing LTE-A with KeyStone SoCs, Texas Instruments, 2012, Dallas, Texas.
Utku Ozturk, Coordinated Multipoint Transmission in Femtocell Systems, Aalto University School of Engineering, Department of Communications and Networking, May 2011.

* cited by examiner

*Primary Examiner* — Candal Elpenord (57) ABSTRACT

A radio access network (RAN) may be configured to communicate with mobile stations using two or more different coordinated multipoint schemes. Further, the RAN may use different coordinated multipoint schemes for different communications with the same mobile station. In particular, methods and systems are disclosed herein that help to intelligently switch between different coordinated multipoint schemes for communications with a given mobile station, based on the remaining battery life of the mobile station.

20 Claims, 5 Drawing Sheets

ADAPTIVE COMP SCHEMES IN LTE NETWORKS BASED ON BATTERY LIFE

BACKGROUND

Many people use mobile stations, such as cell phones, personal digital assistants (PDAs), tablet computers, laptop computers, desktop computers, in-car computers, and so on, to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

To meet increasing demand for high-speed data on mobile devices, cellular service providers have begun implementing "4G" networks, which provide service under one or more 4G air interface protocols, such a long-term evolution (LTE) protocol. LTE was developed by the 3$^{rd}$ Generation Partnership Project (3GPP), and is based on GSM/EDGE and UMTS/HSPA network technology.

In the context of LTE, a mobile station is typically referred to as a "user entity" (UE), and may take various mobile and stationary forms, such as a mobile phone, tablet computer, laptop computer, desktop computer, or any other device configured for wireless communication. Herein, the terms "mobile station," "wireless communication device" (or WCD), and "user entity" (or UE) may be used interchangeably.

OVERVIEW

In cellular radio access networks, such as a Long Term Evolution (LTE) network, reception at cell edges may be problematic for various reasons. For example, the greater distance to a base station at a cell edge may result in lower signal strength. Further, at a cell edge, interference levels from neighboring cells are likely to be higher, as the wireless communication device is generally closer to neighboring cells when at a cell edge.

To help improve the quality of service at cell edges, 3GPP LTE-A Release 11 introduced a number of Coordinated Multipoint (CoMP) schemes. By implementing such CoMP schemes, a group or cluster of base stations may improve service at cell edges by coordinating transmission and/or reception in an effort to avoid inter-cell interference, and in some cases, to convert inter-cell interference into a usable signal that actually improves the quality of service that is provided.

LTE-A Release 11 defines a number of different CoMP schemes for both the uplink (UL) and the downlink (DL). On the downlink, two types of CoMP schemes are set forth: joint processing (JP) schemes and coordinated scheduling/beamforming (CSCH or DL-CSCH) schemes. On the uplink, CoMP schemes typically involve coordinated scheduling (CSCH or UL-CSCH).

When a joint processing scheme is implemented on the downlink, data is available to a UE at multiple base stations (e.g., eNodeBs) simultaneously. Further, under a first type of joint-processing scheme, a cluster of two or more base stations (e.g., eNodeBs) simultaneously transmits data to a user entity (UE). A second type of joint-processing scheme involves dynamic point selection (DPS) (also referred to as dynamic cell selection (DCS)). When DPS is implemented in a joint-processing scheme, data is available to a UE at multiple base stations (e.g., eNodeBs) simultaneously, but is only transmitted from one base station at a time.

Under DL-CSCH schemes, on the other hand, data is only available to a UE from one point at a time (e.g., from one eNodeB or in one cell). However, a cluster of base stations that implement a CSCH scheme may still be able to improve service at cell edges by coordinating frequency assignments and/or coordinating beamforming for the cells in the cluster.

When a joint-processing scheme is implemented, and multiple base stations transmit to a UE simultaneously, the UE may communicate with all of these base stations at once. In order to increase the number of eNodeBs with which a UE is simultaneously communicating, a UE may need to increase its power-consumption rate. Therefore, when a joint-processing scheme is utilized for a communication, a UE may use more power than it would if a coordinated-scheduling scheme were used for the same communication. Further, when a joint-processing scheme with DPS is implemented, a UE may still use more power than if a coordinated-scheduling scheme were used (although less than if another joint-processing scheme were used), because the UE still connects to multiple base stations at once, even though only one base station transmits to the UE at a time.

Thus, among other benefits, exemplary methods and systems may help a UE to conserve power and/or extend battery life by dynamically selecting a coordinated multipoint scheme based on the battery-power level of the UE. For instance, in an exemplary embodiment, a UE may use a JP scheme for its communications whenever the UE's battery power is above a threshold, but switch to use of a CSCH scheme whenever its battery power is below the threshold.

In one aspect, an exemplary method involves a UE: (a) determining a battery-power level of the UE, wherein the UE is configured to use each of a plurality of available coordinated multipoint schemes for communications via a radio access network, wherein the plurality of available coordinated multipoint schemes comprises at least a first and a second coordinated multipoint scheme; (b) using the determined battery-power level as a basis for selecting a coordinated multipoint scheme from the plurality of available coordinated multipoint schemes; and (c) sending, to the radio access network, a message that indicates the selected coordinated multipoint scheme.

In another aspect, an exemplary method may involve a radio access network: (a) determining a battery-power level of a UE, wherein the UE is served by one or more base stations of the radio access network; (b) using the determined battery-power level as a basis for selecting a coordinated multipoint scheme from a plurality of available coordinated multipoint schemes, wherein the plurality of available coordinated multipoint schemes comprises at least a first and a second coordinated multipoint scheme; and (c) configuring the one or more base stations to communicate with the UE according to the selected coordinated multipoint scheme.

In yet another aspect, an exemplary system of a radio access network may include: (i) a tangible computer-readable medium and (ii) program instructions stored in the tangible computer-readable medium and executable by at least one processor to: (a) determine a battery-power level of a UE, wherein the UE is served by one or more base stations of a radio access network; (b) use the determined battery-power level as a basis to select a coordinated multipoint scheme from a plurality of available coordinated multipoint schemes, wherein the plurality of available coordinated multipoint schemes comprises at least a first and a second coordinated multipoint scheme; and (c) configure the one or more base stations to communicate with the UE according to the selected coordinated multipoint scheme.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

1. EXEMPLARY NETWORK ARCHITECTURE

Figure 1:
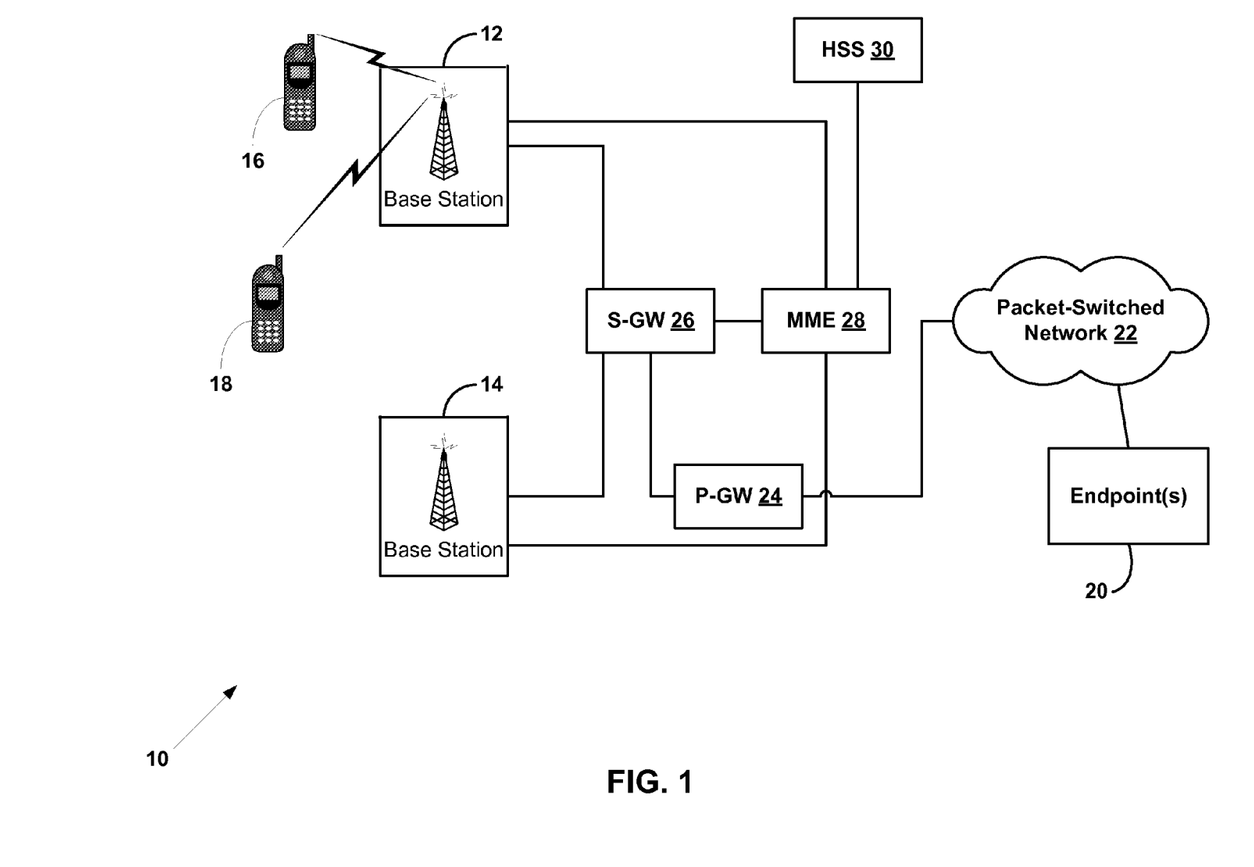
FIG. 1 is a simplified block diagram of a wireless telecommunications network, according to an exemplary embodiment.

FIG. 1 is a simplified block diagram of a wireless telecommunications network 10 in which exemplary embodiments may be employed. For purposes of illustration, FIG. 1 shows a network architecture that may be used in an LTE system. It is to be understood, however, that other network architectures could be used. For instance, an exemplary embodiment may implemented in conjunction with access networks where service is provided under one or more other air interface protocols, such as Code Division Multiple Access (CDMA) protocols (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and infrared protocols, among other possibilities.

Wireless telecommunications network 10 may include a plurality of wireless access points, which are exemplified in FIG. 1 by base stations 12 and 14. In LTE terminology, base stations 12 and 14 may each correspond to an eNodeB, and thus may also be referred to as eNodeBs 12 and 14. Base stations 12 and 14 may each include a wireless coverage area within which the base station is able to wirelessly communicate with user devices, which may also be referred to as a cell, a sector, or a cell-sector. The wireless coverage areas of base stations 12 and 14 could be either overlapping or non-overlapping. Alternatively, the wireless coverage areas of base stations 12 and 14 could be co-extensive, or one wireless coverage area could be encompassed within another. Each wireless coverage area may correspond to a cell. A cell may, in turn, be subdivided into smaller wireless coverage areas, such as sectors. Although FIG. 1 shows wireless telecommunications network 10 with two base stations, it is to be understood that network 10 may include a greater or fewer number of base stations.

For purposes of illustration, base station 12 is shown in wireless communication with user devices 16 and 18, which may also be referred to as user entities (UEs) 16 and 18. User devices 16 and 18 could be wireless telephones, wireless e-mail devices, wirelessly-equipped computers (such as handheld, tablet, or laptop computers), or other types of wireless communication devices. In an exemplary embodiment, the wireless communications between base station 12 and user devices 16 and 18 involve OFDM signals on the downlink (communications transmitted from the base station to a user device) and on the uplink (communications from a user device to the base station). Although FIG. 1 shows base station 12 serving two user devices, it is to be understood, that a base station may serve a greater or fewer number of user devices at a particular point in time.

User devices 16 and 18 could be engaged in communication sessions with one or more endpoints(s) 20 via base station 12. Endpoint(s) 20 may include, for example, one or more voice-over-packet (VoP) communication devices, e-mail servers, messaging servers, streaming media servers, gaming servers, and/or Web servers. In an exemplary embodiment, endpoint(s) 20 are communicatively coupled to a packet-switched network 22. Thus, a communication session between a user device and endpoint(s) 20 may involve the exchange of packets containing voice, video, text, or other data.

To support user devices' communications through packet-switched network 22, wireless telecommunications network 10 may include a packet gateway (P-GW) 24. For example, P-GW 24 may allocate Internet Protocol (IP) addresses for user devices. P-GW 24 may exchange packets with base stations 12 and 14 via a serving gateway (S-GW) 26. S-GW 26 may also serve as an anchor point for communication sessions when user devices move between base stations.

Wireless telecommunications network 10 may also include one or more control nodes that control communications involving user devices, such as user devices 16 and 18. For example, network 10 may include a mobility management entity (MME) 28, which controls communications between user devices and S-GW 26. MME 28 may, in turn, be communicatively coupled to a home subscriber server (HSS) 30, which stores subscriber information.

Under LTE, UEs 16 and 18 may operate in one of three possible states, LTE_DETACHED, LTE_IDLE, and LTE_ACTIVE. A UE 16 or 18 typically operates in the LTE_DETACHED state while it is searching for and registering with the network. A UE 16 or 18 typically operates in the LTE_ACTIVE state once it has registered with the network and has a radio resource control (RRC) connection with an eNodeB (e.g., while actively engaged in a communication). Further, a UE 16 or 18 typically operates in the LTE_IDLE state when it is registered, but is not engaged in a communication, and thus does not have an RRC connection.

II. COORDINATED MULTIPOINT SCHEMES

As noted above, a network such wireless telecommunications network 10 may implement various types of coordinated multipoint (CoMP schemes), which may specify various techniques by which base stations may coordinate to improve uplink and/or downlink service.

Figure 2:
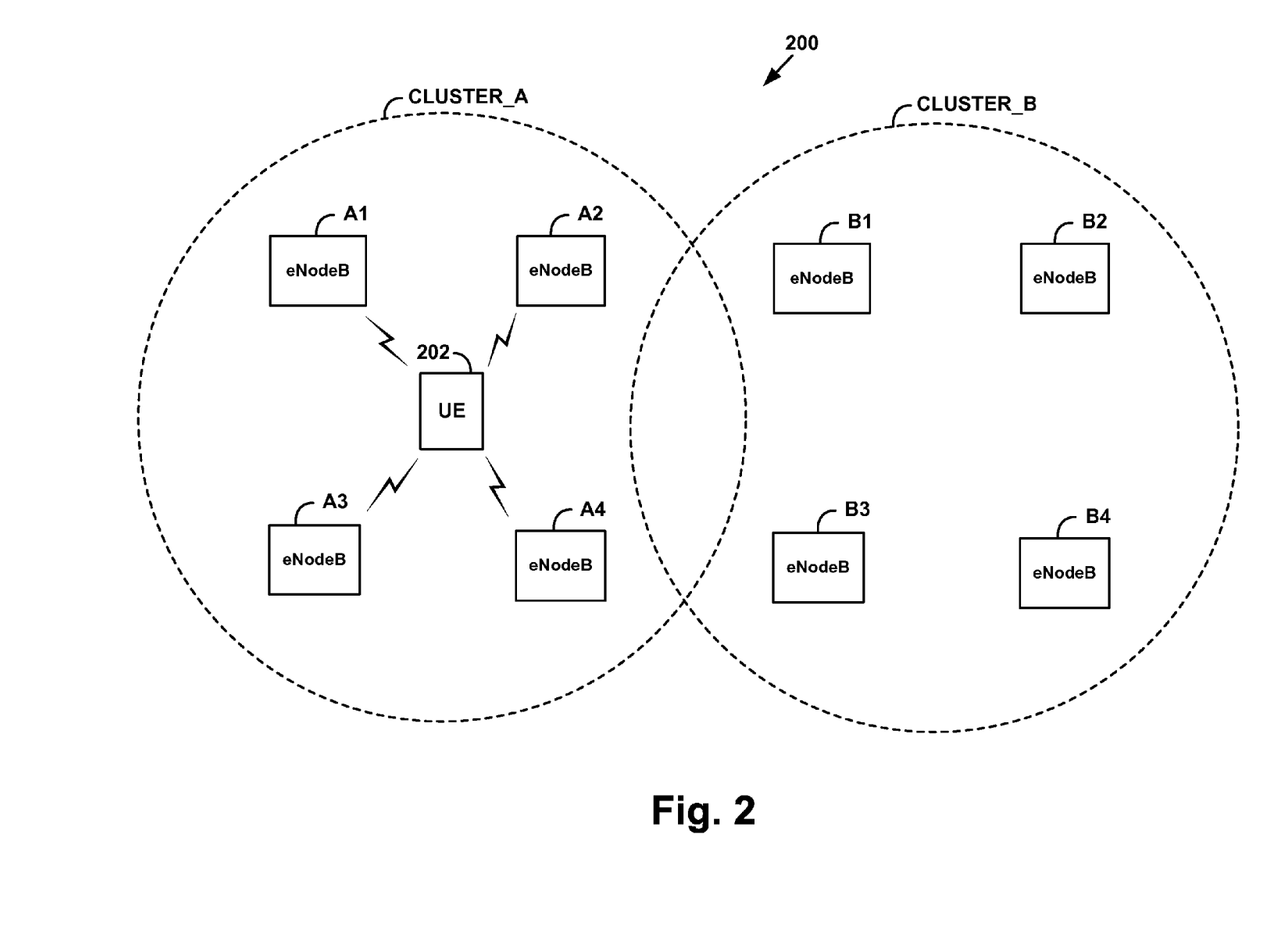
FIG. 2 is a simplified block diagram illustrating a network arrangement in which coordinated multipoint schemes may be implemented, according to an exemplary embodiment.

FIG. 2 is a simplified block diagram illustrating a network arrangement in which CoMP schemes may be implemented. In particular, FIG. 2 shows a portion of an LTE network 200, which includes base stations A1 to A4 and B1 to B4. Further, a UE 202 is operating in the coverage area of LTE network 200.

In order to implement various CoMP schemes, base stations A1 to A4 and B1 to B4 may be grouped into clusters, where the base stations in each cluster coordinate according to whichever CoMP scheme is implemented at a given point in time. In the illustrated scenario, there are two clusters: (i) cluster_A, which includes eNodeBs A1 to A4, and (ii) cluster_B, which includes eNodeBs B1 to B4. Further, in the illustrated scenario, UE 202 is being served by the eNodeBs A1 to A4 in cluster_A. Note that the clusters, such as cluster_A and cluster_B, may be predetermined and static. Alternatively, the LTE network may dynamically and intelligently update the clustering of base stations in an effort to improve service.

In a further aspect, to facilitate some CoMP schemes, a master base station may be specified for each cluster. The master base station in a cluster may take the lead to coordinate various functions between the base stations in the cluster. For example, eNodeB A1 may function as the master base station in cluster A, and eNodeB B1 may function as the master base station in cluster B. Other examples are also possible.

On the downlink, an LTE network 200 may configure eNodeBs for two types of CoMP schemes: joint processing (JP) and coordinated scheduling/beamforming (CSCH or DL-CSCH).

A. Joint Processing

When eNodeBs A1 to A4 implement a joint processing scheme on the downlink, data is available to UE 202 from multiple eNodeBs simultaneously. For example, in FIG. 2, UE 202 is shown as being connected to all the eNodeBs A1 to A4 in cluster_A. Accordingly, if joint transmission is implemented for UE 202 in cluster_A, then UE 202 may simultaneously communicate with all the eNodeBs A1 to A4 in cluster_A.

Under a first type of joint-processing scheme, which may also be referred to as a joint transmission (JT) scheme, two or more of eNodeBs A1 to A4 may transmit data to UE 202 at the same time. As such, the signals from two or more of eNodeBs A1 to A4 may be combined at UE 202. Further, the signals may be combined coherently or non-coherently at UE 202, depending upon the particular implementation.

To implement joint transmission, eNodeBs A1 to A4 may share data that is intended for UE 202, so that the data may be jointly processed and transmitted. More specifically, eNodeBs A1 to A4 may coordinate in an effort to improve pre-coding matrices for inter-cell coordination, such that the SINR increases at UE 202. Applying such pre-coding at each eNodeB, eNodeBs A1 to A4 then transmit to the UE 202 on the same resource block of the physical downlink shared channel (PDSCH).

Under a second type of joint-processing scheme, which may also be referred to as dynamic point selection (DPS) or dynamic cell selection (DCS), data is available to UE 202 at two or more eNodeBs simultaneously, but is only transmitted from one eNodeB at a time. For example, if cluster_A implemented DPS, only one eNodeB from cluster_A may transmit in the UE's resource block of the PDSCH at a time. This may help to increase the SINR ratio at UE 202, since other eNodeBs in cluster_A do not transmit on the UE's resource block.

Under DPS, the particular eNodeB that transmits at a given point in time may be selected using various techniques. For instance, if eNodeB A1 is configured as a master base station for cluster_A, then eNodeB A1 may consider various factors to determine which of eNode A1 to A4 should transmit to UE 202 at a given point in time. As an example, eNodeB A1 may implement a fast-scheduling technique that considers minimum path loss in order to dynamically select the transmitting eNodeB at a given point in time. Other examples are also possible.

B. Coordinated Scheduling

As noted above, under CSCH schemes, data is only available to UE 202 from one point at a time (e.g., from one eNodeB or in one cell at a time). However, under a CSCH scheme, the eNodeBs A1 to A4 in a cluster may still coordinate in an effort to reduce interference and increase the SINR at the UE 202.

For example, when a given eNodeB A1 is selected to transmit to a UE 202, the other eNodeBs A2 to A4 in the cluster select other UEs to transmit to, so as to decrease the interference with the signal from eNodeB A1 that is experienced at UE 202. Such a technique may be referred to as an interference-mitigation technique. Since such interference mitigation techniques are well known in the art, such techniques are not described further herein.

C. Intelligently Using Multiple CoMP Schemes in a RAN

In an exemplary embodiment, base stations in a radio access network, such as LTE network 200, may switch between different CoMP schemes for a given UE 202, based on the remaining battery life of the given UE. More specifically, an LTE network 200 may include in one or more of its components, data storage with program instructions that are executable to: (a) determine the battery-power level of a particular UE 202 that is connected to a cluster of one or more eNodeBs A1 to A4, (b) use the determined battery-power level as a basis for selecting a coordinated multipoint scheme from a plurality of available coordinated multipoint schemes, which include at least a first and a second coordinated multipoint scheme (e.g., a JP scheme and a CSCH scheme), and (c) configure the cluster of one or more eNodeBs A1 to A4 to use the selected coordinated multipoint scheme to communicate with the particular UE 202.

To facilitate the above functionality, a UE 202 may send one or more eNodeBs A1 to A4 an indication of the UE's battery-power level. For example, a UE 202 may include an indication of its battery-power level in a channel quality indicator (CQI) message, which the UE sends via the physical uplink control channel (PUCCH). The RAN 200 may then use the indication of the UE's battery-power level to select a new CoMP scheme for the UE 202, if appropriate. (Note that if the indicated battery-power level corresponds to the same CoMP scheme that the UE is currently assigned, then no action may be taken.)

When a new CoMP scheme is selected for a UE 202, data records for the UE may be created or updated at eNodeBs that will serve the UE under the new CoMP scheme and/or at eNodeBs that served the UE under the previous CoMP scheme, but will no longer serve the UE under the new CoMP scheme. Additionally or alternatively, records of CoMP schemes that are assigned to particular UEs may be kept at other components of RAN. For example, in an LTE network, records of CoMP schemes that are assigned to particular UEs may be stored in an MME or an S-GW, among other possibilities.

In a scenario where UE 202 is operating according to a joint processing scheme, the UE may notify the master eNodeB A1 of its battery-power level. eNodeB A1 may then evaluate the battery-power level and determine whether joint-processing is still appropriate, or whether the RAN 200 should switch to a CSCH scheme for UE 202. If eNodeB A1 determines that a switch to a CSCH scheme should be made, then eNodeB A1 may coordinate with the other eNodeBs in cluster_A so that they will not use the joint processing scheme for UE 202. Alternatively, in a scenario where UE 202 is operating according to a joint processing scheme, the UE could separately indicate its battery-power level to all the eNodeBs A1 to A4 in its serving cluster, and each eNodeB A1 to A4 could separately evaluate the battery-power level and determine whether joint-processing is still appropriate.

In a scenario where UE 202 is operating according to a CSCH scheme, it may notify its serving eNodeB of its battery-power level. Then, if a switch to a joint-processing scheme is appropriate, the serving eNodeB may then determine an appropriate cluster of eNodeBs for communications with the UE 202 using joint processing, and coordinate with those eNodeBs to implement a joint processing scheme for subsequent communications with the UE.

Note that different clusters within the same network may be configured for different CoMP schemes at the same time. Yet further, base stations may be clustered in the same manner for different UEs, or grouped into different clusters for different UEs. Even further, a given base station or cluster of base stations may use different CoMP schemes to communicate with different UEs at the same time.

III. EXEMPLARY RAN COMPONENTS

Figure 3:
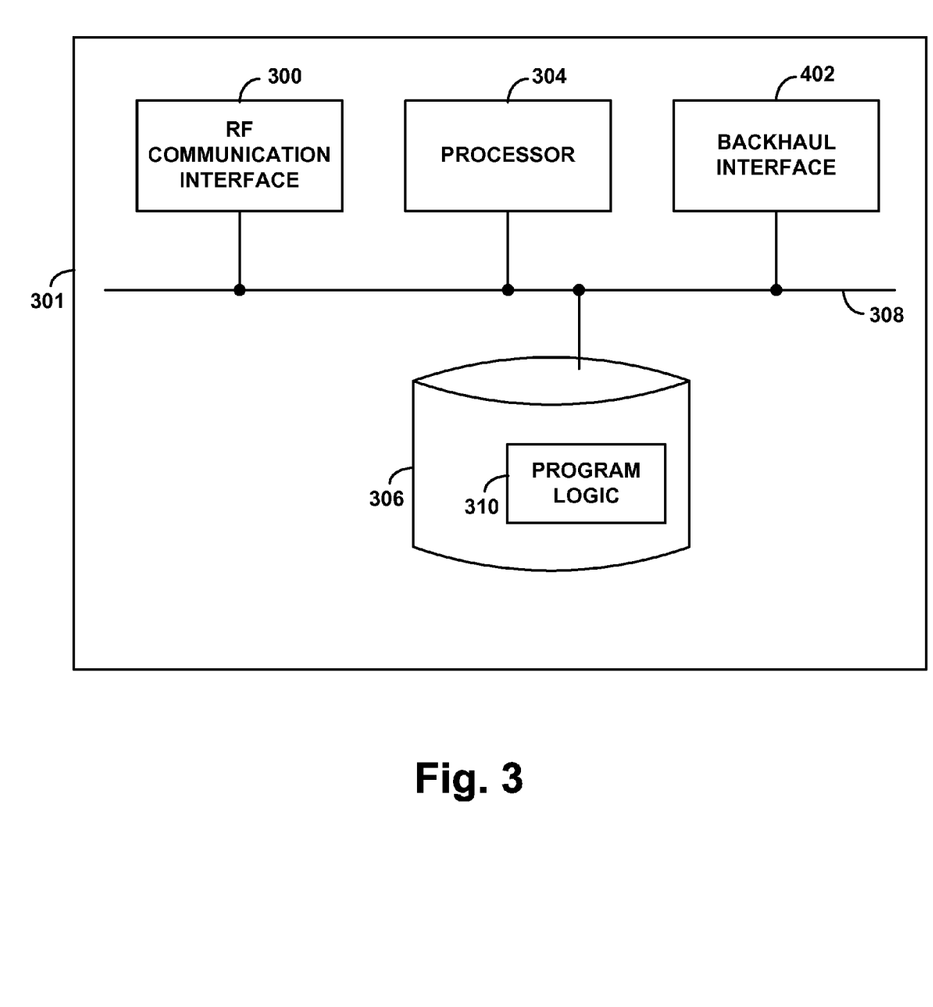
FIG. 3 is a simplified block diagram illustrating a component of a radio access network, according to an exemplary embodiment.

FIG. 3 is a simplified block diagram illustrating a RAN component, according to an exemplary embodiment. More specifically, FIG. 3 illustrates some of the functional components that would likely be found in a RAN component 301 arranged to operate in accordance with the embodiments herein. As shown, the RAN component 301 may include an RF communication interface 300, a backhaul interface 302, a processor 304, and data storage 306, all of which may be communicatively linked together by a system bus, network, or one or more other connection mechanisms 308. Further, the RAN component 301 may be, for example, an eNodeB, a S-GW, an MME, a BTS, BSC, BTS/BSC combination, and/or an MSC, among other possibilities.

An exemplary system could be implemented as part a RAN component 301, could take the form of such a RAN component, or might include two or more of such RAN components (e.g., the eNodeBs in a cluster, and possibly a S-GW and/or MME). Accordingly, the illustrated components of RAN component 301 (e.g., communication interface 300, a backhaul interface 302, a processor 304, and data storage 306) may be distributed and/or subdivided between two or more RAN components, or may be implemented in a single RAN component.

In RAN component 301, RF communication interface 300 may comprise one or more antenna structures, one or more power amplifiers, and associated equipment, for engaging in RF communication with mobile stations operating within the base station's coverage, according to one of the air-interface protocols noted above for instance. Backhaul interface 302 may comprise any sort of communication link or mechanism enabling the base station to exchange signaling and bearer data with other RAN entities, such as with MSC 52 for instance. Processor 304 may comprise one or more processors (e.g., general purpose and/or special purpose processors), such as microprocessors for instance.

Data storage 306 may be a non-transitory computer readable medium. For example, data storage 306 may take the form of one or more volatile and/or non-volatile storage components, such as magnetic, optical, or organic storage components, integrated in whole or in part with processor 304.

As further shown, data storage 306 contains program logic 310 (e.g., machine language instructions) executable by processor 304 to carry out various functions, such as the functionality of the exemplary methods and systems described herein. In an exemplary embodiment, data storage 306 may include program instructions that are executable by processor 304 to provide the various functionality of a RAN and components thereof, which is described herein.

Referring back to FIG. 2, eNodeBs A1 to A4 and B1 to B4 may be configured in the same or similar manner as RAN component 301. Further, an LTE network 200 may be configured to switch between different CoMP schemes for a given UE 202. For example, a given cluster of eNodeBs A1 to A4 may be configurable to communicate with a given UE using a CoMP scheme that is selected from one or more types of available joint-processing schemes and/or one or more types of available CSCH schemes.

IV. EXEMPLARY METHODS

Figure 4:
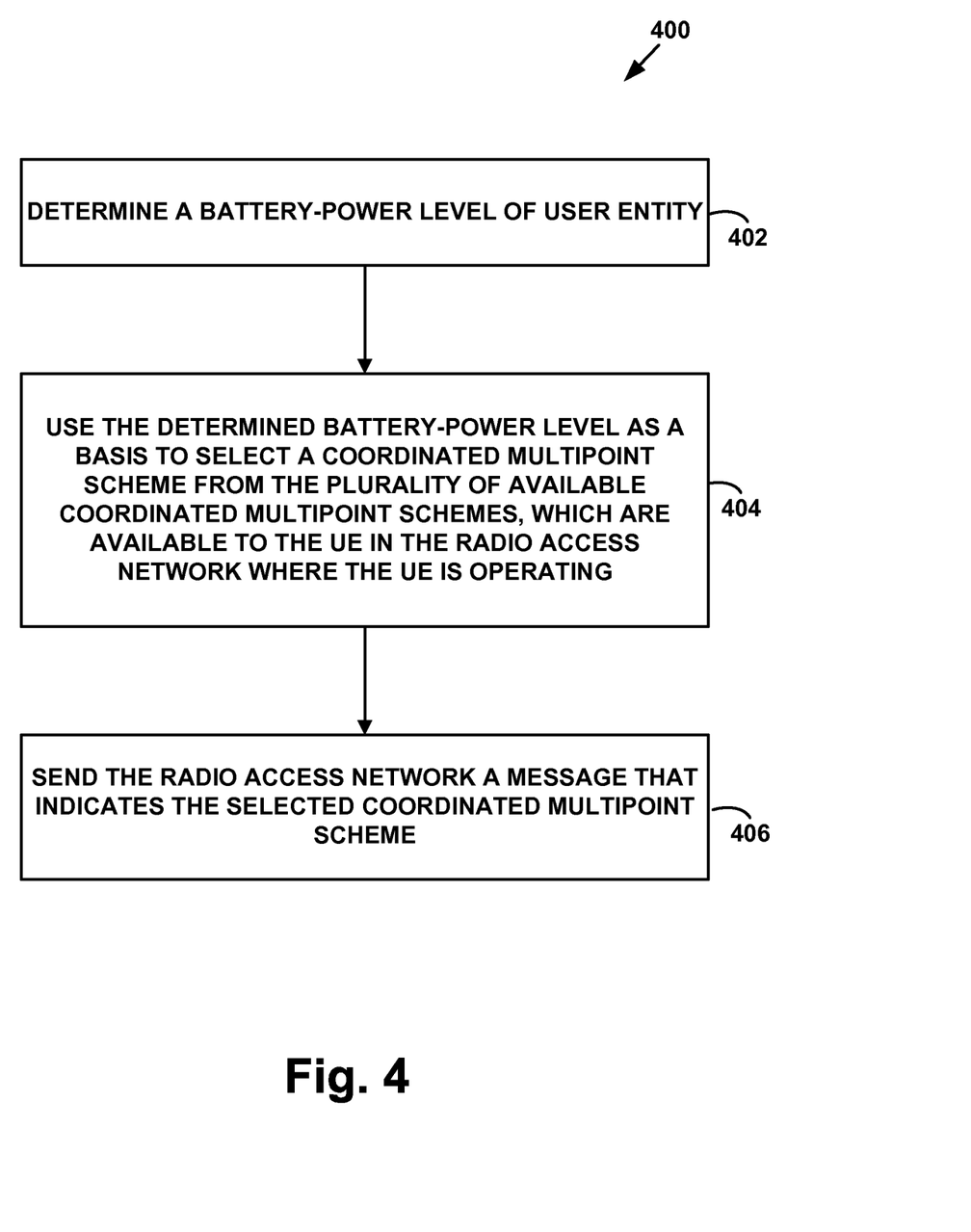
FIG. 4 is a flow chart illustrating a method, according to an exemplary embodiment.

FIG. 4 is a flow chart illustrating a method 400, according to an exemplary embodiment. Method 400 may be carried out by a UE that is configured to use a plurality of coordinated multipoint schemes for communications via a radio access network, including at least a first and a second coordinated multipoint scheme, such as a CSCH scheme and a JP scheme.

As shown by block 402, method 400 involves a UE determining a battery-power level of the UE. The UE then uses the determined battery-power level as a basis to select a CoMP scheme from the plurality of available CoMP schemes that are available from the radio access network in which the UE is operating, as shown by block 404. The UE may then send the radio access network a message that indicates the selected CoMP scheme, as shown by block 406.

At block 402, a UE may determine its battery-power level in any way that is appropriate to the particular implementation. For example, a UE may determine the battery-power level at a given point in time by determining the percentage of the fully-charged power that remains or that has been used, the total amount of power that remains or that has been used, or the expected remaining battery life (e.g., time until the battery is fully drained). Other examples are also possible.

In an exemplary embodiment, block 404 may involve the UE comparing the determined battery-power level to a threshold, and selecting a CoMP scheme based on the comparison. For instance, if the determined battery-power level is above a threshold, then the UE may select the first CoMP scheme. And, if the determined battery-power level is below the threshold, then the UE may select the second CoMP scheme.

As a specific example, the UE may select a JP scheme when the battery-power level is above the threshold, and may select a CSCH scheme when the battery-power level drops below the threshold. As such, the UE may switch to use of a JP scheme, which typically uses power at a lower rate than a CSCH scheme, when the UE's battery-power level is low. Note that the threshold level at which the UE switches to a JP scheme may vary, depending upon the particular implementation. Note that the selected JP scheme may be a joint transmission scheme, a joint transmission and reception scheme, or JP scheme with DPS.

In a further aspect, at block 404, the UE may select a CoMP scheme for the uplink only, for the downlink only, or for both the uplink and the downlink. In either case, the UE may notify the RAN of the selected CoMP scheme at block 406, so that one or more components of the RAN can be configured to communicate with the UE according to the selected CoMP scheme. For example, at block 406, a UE 202 may send a CQI message, which indicates the selected CoMP scheme, to one or more base stations via PUCCH for each base station. (Note that if the selected CoMP scheme is the same CoMP scheme that is already being used by the RAN, then the UE could refrain from messaging the RAN.) Other types of messages may also be used to notify the RAN of a selected CoMP scheme, without departing from the scope of the invention.

In a further aspect, when a UE selects a CoMP scheme, the UE may send a message that indicates the selected CoMP scheme to: (a) each base station that the UE is connected to (e.g., to each eNodeB in a cluster), (b) a master base station in a cluster (if the RAN is currently configured to communicate with the UE using joint processing), or (c) a serving base station (if the RAN is currently configured to communicate with the UE under a CSCH scheme).

In some cases, method 400 may be carried out at a time when the UE is not actively engaged in a communication, such as when a UE is operating in the LTE_DETACHED or LTE_IDLE state. For example, if the UE battery-power level is initially above a threshold, the UE may be configured to use a joint-processing scheme. However, the UE battery-power level drops below a threshold while the UE is in an LTE_IDLE state, the UE may responsively reconfigure itself to use a CSCH scheme for subsequent communications, instead of the JP scheme. Similarly, while in an LTE_IDLE state, a UE that is configured to use a CSCH scheme may be recharged, such that the battery-power level increases to above the threshold level. Accordingly, the UE may re-configure itself to use a joint-processing scheme for subsequent communications, instead of the CSCH scheme.

In other cases, method 400 or portions thereof may be carried out at a time when the UE is actively engaged in a communication, such as when a UE is operating in the LTE_ACTIVE state. For example, a UE may initiate a data transfer when its battery-power level is above a threshold level, and begin the data transfer using a JP scheme (under which the UE simultaneously transmits to and/or simultaneously receives from multiple eNodeBs). As a UE consumes power during the data transfer, its battery-power level may fall below the threshold level. In an exemplary embodiment, if the UE's battery-power level drops below the threshold in the midst of the data transfer or another type of communication, the UE may refrain from selecting a CoMP scheme and/or refrain from notifying the RAN of the selected CoMP scheme. By doing so, the UE may avoid switching CoMP schemes in the middle of a communication. Alternatively, when the UE detects that its battery-power level is below the threshold in during a communication, it may be possible for the UE to select a new CoMP scheme and notify the RAN thereof, during the communication, such that the RAN switches to the new CoMP scheme mid-communication.

In a further aspect of an exemplary embodiment, a UE may implement a process to monitor its battery-power level and detect when its battery-power level is low. In block 402 of such an embodiment, the UE may determine it battery-power level. Then, at block 404, the UE may compare the determined battery-power level to a threshold level in order to detect when the battery-power level is below the threshold level. In the event that the battery-power level remains above the threshold level (if it was previously above the threshold), or remains below the threshold level (if it was previously below the threshold), then the UE may leave its CoMP scheme unchanged. However, if the UE detects that the battery-power level has dropped below the threshold level (if it was previously above the threshold or rise), or has risen above the threshold level (if it was previously below the threshold), then the UE may responsively switch between CoMP schemes.

In FIG. 4, the intelligence to select a CoMP scheme was implemented in a UE. In other embodiments, the RAN may select a CoMP scheme for a UE. In such an embodiment, a UE may send an indication of its battery-power level to the RAN, which the RAN may then use to select an appropriate CoMP scheme for the UE. Note that the UE may indicate its battery-power level to the RAN periodically, or on an as-needed basis (e.g., when it detects that its battery-power level has dropped below a threshold level).

Figure 5:
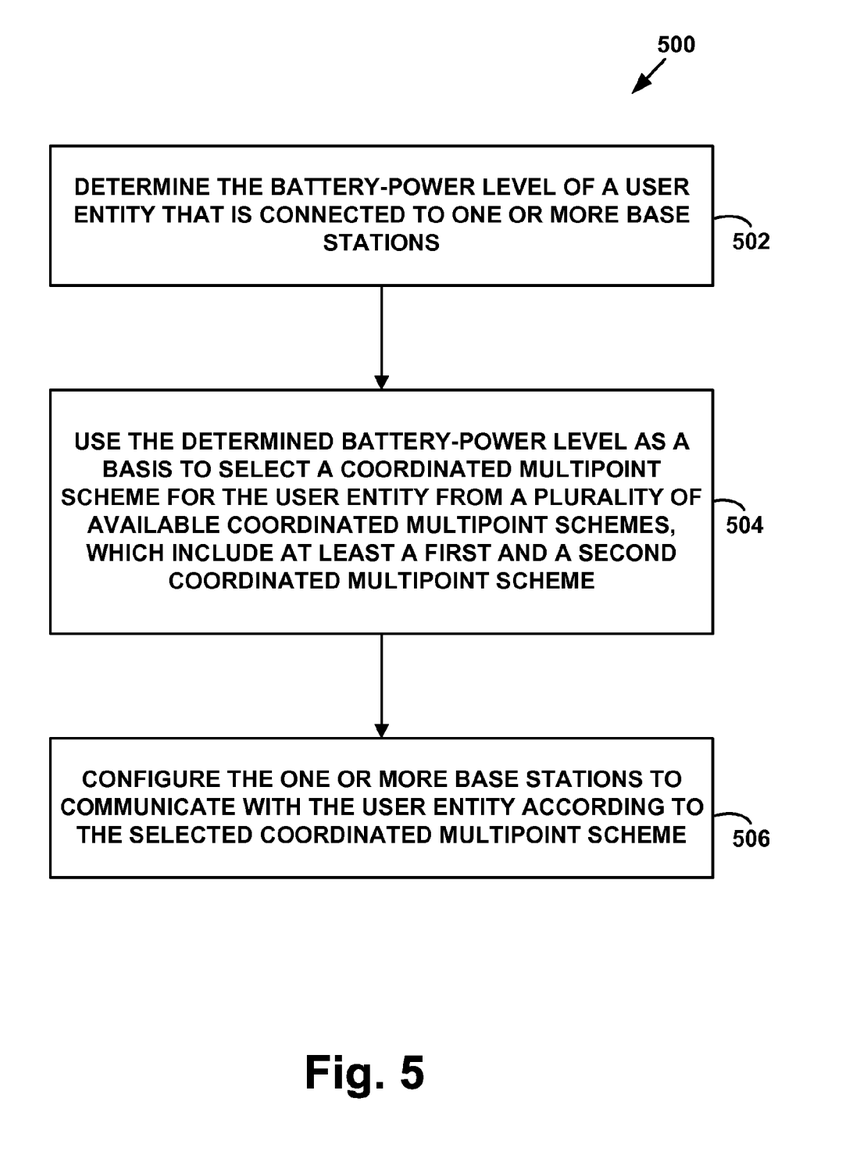
FIG. 5 is a flow chart illustrating a method that may be implemented by a radio access network, according to an exemplary embodiment.

FIG. 5 is a flow chart illustrating a method 500 that may be implemented by one or more components of RAN, according to an exemplary embodiment. For simplicity, method 500 is simply described as being carried out by a RAN, which should be understood to include being carried out by a component of a RAN or a combination of components of a RAN. For example, method 500 may be implemented by an eNodeB, a cluster of eNodeBs, an MME, or other components or combinations of components of an LTE network. Method 500 could also be implemented by components or combinations of components in RANs that provide service under other wireless protocols.

As shown by block 502, method 500 involves a RAN determining the battery-power level of a UE that is connected to one or more base stations. The RAN then uses the determined battery-power level as a basis for selecting a CoMP scheme from a plurality of available CoMP schemes, which include at least a first and a second CoMP scheme, as shown by block 504. The RAN then configures the one or more base stations to communicate with the UE according to the selected coordinated multipoint scheme, as shown by block 506.

At block 502, the determination of the UE's battery-power level may simply involve the RAN receiving one or more messages from a UE that indicate the UE's battery-power level. For example, a UE 202 may include an indication of its battery-power level in a CQI message, which the UE sends to an eNodeB via the PUCCH. However, the RAN may determine a UE's battery-power level in other ways, without departing from the scope of the invention.

In a further aspect, when the RAN selects a CoMP scheme for a UE that is different from a current CoMP scheme, the RAN may update or create data records for the UE to reflect the selected CoMP scheme. For example, data records for the UE may be created or updated at eNodeBs that will serve the UE under the new CoMP scheme and/or at eNodeBs that served the UE under the previous CoMP scheme, but will no longer serve the UE under the new CoMP scheme. Data records of CoMP schemes that are assigned to particular UEs may also be kept at other components of RAN. For example, in an LTE network, records of CoMP schemes that are assigned to particular UEs may be stored in an MME or an S-GW, among other possibilities.

In a further aspect, in a scenario where the RAN has previously selected a joint-processing scheme to UE, method 500 may be implemented by a master eNodeB in the serving cluster for the UE. In particular, at block 504, the master eNodeB may evaluate the battery-power level and determine whether joint-processing is still appropriate, or whether the RAN should switch to a CSCH scheme for UE. If the master eNodeB determines that a switch to a CSCH scheme is appropriate (e.g., because the battery-power level is below a threshold), then the master eNodeB may coordinate with the other eNodeBs in the serving cluster so that these eNodeBs will use a CSCH, instead of the joint processing scheme, for subsequent communications with the UE.

In a different scenario, where the RAN has previously selected a CSCH scheme, method 500 may be implemented by the serving eNodeB for the UE. If the serving eNodeB determines that a switch to a joint-processing scheme is appropriate (e.g., because the UE's battery has been charged to above the threshold battery-power level), then the serving eNodeB may determine other eNodeBs that are included in a serving cluster for the UE, under the joint-processing scheme, and coordinate with those eNodeBs to implement the joint processing scheme for subsequent communications with the UE.

V. CONCLUSION

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
    (a) a user entity (UE) determining a battery-power level of the UE, wherein the UE is configured to use each of a plurality of available coordinated multipoint schemes for communications via a radio access network, wherein the plurality of available coordinated multipoint schemes comprises at least a first and a second coordinated multipoint scheme;
    (b) the UE using the determined battery-power level as a basis for selecting a coordinated multipoint scheme from the plurality of available coordinated multipoint schemes; and
    (c) the UE sending, to the radio access network, a message that indicates the selected coordinated multipoint scheme.

2. The method of claim 1, wherein the first coordinated multipoint scheme is a joint-processing scheme, and wherein the second coordinated multipoint scheme is a coordinated-scheduling scheme.

3. The method of claim 2, wherein the UE is initially provided service by the radio access network according to the joint-processing scheme, wherein the selected coordinated multipoint scheme is the coordinated-scheduling scheme, and wherein the message to the radio access network comprises a request to switch to the coordinated-scheduling scheme for subsequent communications with the UE.

4. The method of claim 2, wherein the UE is initially provided service by the radio access network according to the coordinated-scheduling scheme, wherein the selected coordinated multipoint scheme is the a joint-processing scheme, and wherein the message to the radio access network comprises a request to switch to the joint-processing scheme for subsequent communications with the UE.

5. The method of claim 1, wherein using the determined battery-power level as a basis for selecting a coordinated multipoint scheme from a plurality of available coordinated multipoint schemes comprises:
    if the determined battery-power level is above a first threshold, then selecting the first coordinated multipoint scheme; and
    if the determined battery-power level is below the first threshold, then selecting the second coordinated multipoint scheme.

6. The method of claim 5, wherein the first coordinated multipoint scheme provides for joint processing, and wherein the second coordinated multipoint scheme provides for coordinated scheduling.

7. The method of claim 1, wherein the UE is connected to one or more base stations in the radio access network, and wherein sending the message to the radio access network to indicate the selected coordinated multipoint scheme comprises sending a message to each of one or more base stations that indicates that indicates the selected coordinated multipoint scheme.

8. The method of claim 1, further comprising determining the battery-power level of the UE is below a threshold level, wherein the UE performs (b) and (c) in response to the determination that the battery-power level of the UE is below the threshold level.

9. The method of claim 1, wherein the first coordinated multipoint scheme is a joint-processing scheme with joint transmission, wherein the second coordinated multipoint scheme is a coordinated-scheduling scheme, wherein the plurality of available coordinated multipoint schemes further comprises a joint-processing scheme with dynamic point selection (DPS), and wherein selecting a coordinated multipoint scheme from the plurality of available coordinated multipoint schemes comprises:
    if the battery-power level is above a first threshold, then selecting the joint-processing scheme with joint transmission;
    if the battery-power level is below the first threshold and above a second threshold, then selecting the joint-processing scheme with DPS, wherein the first threshold is greater than the second threshold; and
    if the battery-power level is below the second threshold, then selecting the coordinated-scheduling scheme.

10. A method comprising:
    determining, by a radio access network, a battery-power level of a UE, wherein the UE is served by one or more base stations of the radio access network;

the radio access network using the determined battery-power level as a basis for selecting a coordinated multipoint scheme from a plurality of available coordinated multipoint schemes, wherein the plurality of available coordinated multipoint schemes comprises at least a first and a second coordinated multipoint scheme; and the radio access network configuring the one or more base stations to communicate with the UE according to the selected coordinated multipoint scheme.

11. The method of claim 10, wherein the first coordinated multipoint scheme is a joint-processing scheme, and wherein the second coordinated multipoint scheme is a coordinated-scheduling scheme.

12. The method of claim 11, wherein the one or more base stations are initially configured to communicate with the UE according to the joint-processing scheme, wherein the selected coordinated multipoint scheme is the coordinated-scheduling scheme, and wherein configuring the one or more base stations to communicate with the UE according to the selected coordinated multipoint scheme comprises re-configuring the one or more base stations to communicate with the UE according to coordinated-scheduling scheme instead of the joint-processing scheme.

13. The method of claim 11, wherein the one or more base stations are initially configured to communicate with the UE according to the coordinated-scheduling scheme, wherein the selected coordinated multipoint scheme is the joint-processing scheme, and wherein configuring the one or more base stations to communicate with the UE according to the selected coordinated multipoint scheme comprises re-configuring the one or more base stations to communicate with the UE according to joint-processing scheme instead of the coordinated-scheduling scheme.

14. The method of claim 10, wherein using the determined battery-power level as a basis for selecting a coordinated multipoint scheme from the plurality of available coordinated multipoint schemes comprises:
　if the determined battery-power level is above a first threshold, then selecting the first coordinated multipoint scheme; and
　if the determined battery-power level is below the first threshold, then selecting the second coordinated multipoint scheme.

15. The method of claim 14, wherein the first coordinated multipoint scheme provides for joint processing, and wherein the second coordinated multipoint scheme provides for coordinated scheduling.

16. A system comprising:
　a non-transitory computer-readable medium; and
　program instructions stored in the non-transitory computer-readable medium and executable by at least one processor to:
　　(a) determine a battery-power level of a user entity (UE), wherein the UE is served by one or more base stations of a radio access network;
　　(b) use the determined battery-power level as a basis to select a coordinated multipoint scheme from a plurality of available coordinated multipoint schemes, wherein the plurality of available coordinated multipoint schemes comprises at least a first and a second coordinated multipoint scheme; and
　　(c) configure the one or more base stations to communicate with the UE according to the selected coordinated multipoint scheme.

17. The system of claim 16, wherein the one or more base stations are initially configured to communicate with the UE according to a joint-processing scheme, wherein the selected coordinated multipoint scheme is a coordinated-scheduling scheme, and
　wherein the program instructions stored in the non-transitory computer-readable medium and executable by at least one processor to configure the one or more base stations to communicate with the UE according to the selected coordinated multipoint scheme comprise program instructions stored in the non-transitory computer-readable medium and executable by at least one processor to re-configure the one or more base stations to communicate with the UE according to coordinated-scheduling scheme instead of the joint-processing scheme.

18. The system of claim 16, wherein the one or more base stations are initially configured to communicate with the UE according to a coordinated-scheduling scheme, wherein the selected coordinated multipoint scheme is a joint-processing scheme, and
　wherein the program instructions stored in the non-transitory computer-readable medium and executable by at least one processor to configure the one or more base stations to communicate with the UE according to the selected coordinated multipoint scheme comprise program instructions stored in the non-transitory computer-readable medium and executable by at least one processor to re-configure the one or more base stations to communicate with the UE according to joint-processing scheme instead of the coordinated-scheduling scheme.

19. The system of claim 16, wherein the program instructions stored in the non-transitory computer-readable medium and executable by at least one processor to use the determined battery-power level as a basis to select the coordinated multipoint scheme from the plurality of available coordinated multipoint schemes comprise program instructions stored in the non-transitory computer-readable medium and executable by at least one processor to:
　if the determined battery-power level is above a first threshold, then select the first coordinated multipoint scheme; and
　if the determined battery-power level is below the first threshold, then select the second coordinated multipoint scheme.

20. The system of claim 19, wherein the first coordinated multipoint scheme provides for joint processing, and wherein the second coordinated multipoint scheme provides for coordinated scheduling.

* * * * *